United States Patent [19]

Ogawa

[11] Patent Number: 5,050,006
[45] Date of Patent: Sep. 17, 1991

[54] MULTI-ADDRESS CALLING SYSTEM

[75] Inventor: Satoshi Ogawa, Tama, Japan

[73] Assignee: Fujitsu Limited, Kawasaki, Japan

[21] Appl. No.: 333,251

[22] Filed: Apr. 5, 1989

[30] Foreign Application Priority Data

Apr. 14, 1988 [JP] Japan ............................. 63-092397

[51] Int. Cl.⁵ .............................................. H04N 1/00
[52] U.S. Cl. .................................. 358/440; 358/407; 358/402
[58] Field of Search ............... 358/440, 407, 408, 402, 358/496; 379/100

[56] References Cited

U.S. PATENT DOCUMENTS

| 4,532,379 | 2/1988 | Tsukioka | 358/440 |
| 4,622,592 | 11/1986 | Ikehata et al. | 358/440 |
| 4,754,335 | 6/1988 | Izawa et al. | 358/440 |

FOREIGN PATENT DOCUMENTS

| 6078873 | 5/1985 | Japan | 358/440 |
| 2089619 | 6/1982 | United Kingdom | 358/440 |

Primary Examiner—Edward L. Coles, Sr.
Attorney, Agent, or Firm—Staas & Halsey

[57] ABSTRACT

Disclosed is a multi-address calling system in a facsimile device in which transmission of picture data to at least a first destination is effected in parallel and asynchronous with the reading, compacting and storing of the picture data, whereby the accessibility of the equipment is increased.

17 Claims, 7 Drawing Sheets

MULTI-ADDRESS CALLING SYSTEM

BACKGROUND OF THE INVENTION

1. Field of the Invention

The present invention relates to a multi-address calling system, and more particularly, to a multi-address calling system in a facsimile device capable of effecting multi-address calling with increased accessibility.

2. Description of the Related Art

A known facsimile device can transmit picture data of characters, photographs, etc., printed on paper by using a communication line. Currently, this picture communication can be conducted through public telephone lines, and thus such facsimile equipment is now widely used in the office automation (OA) field.

In such facsimile equipment, recently, many of these machines have a multi-address calling function by which the information printed on one or more sheets of paper is read and stored in a picture memory, and is then transmitted to a number of destinations.

In a conventional multi-address calling system, all pages to be transmitted are first read, compressed and stored in a picture memory, and then only after the storing operation is finished, a pre-procedure, the transmission of the picture data, and a post-procedure are carried out for the first destination.

Therefore, the start of the picture transmission is delayed especially when there is a large number of pages to be stored. Thus, the availability of equipment of this type is low.

In another conventional multi-address calling system disclosed in for example Japanese Unexamined Patent Publication No. 63-36651, published on Feb. 17, 1988, filed by Toshiba Corporation, the reading, compression, and storing of the picture data are effected in parallel with the transmission of the picture data to the first destination. In this conventional system, the pre-procedure, the transmission of the picture data, and the post-procedure for the first destination are started without waiting for the reading, compression, and storing operation of the to end. This conventional example, however, still has a disadvantage in that there are periods of time when the device is not available for use because the reading, compression, and storing of each page are synchronous with the transmission of the corresponding page to the first destination. Namely, when another set of pages is to be transmitted, the user must wait until the previous set of pages is completely transmitted to the first destination. When the previous set of pages is large in volume, the user must wait for a long time.

SUMMARY OF THE INVENTION

The present invention was created in view of the above-mentioned problems, and an object thereof is to provide a facsimile device having unrestricted accessibility during a multi-address calling operation.

There is provided, according to the present invention, a multi-address calling system for transmitting the same picture data to a plurality of destinations. The system comprises reading means for reading picture data from sheets or paper; compressing means for compressing the picture data read by the reading means; storing means for storing the picture data compressed by the compressing means; communication control means for transmitting and receiving signals for communication procedures with the destinations and for transmitting the picture data; and control means for effecting the communication procedures with the first destination in parallel with and asynchronous with the processes carried out by the reading means, the compacting means, and the storing means.

Because the communication procedures are asynchronous with the reading, compressing, and storing, the set of pages to be transmitted is rapidly stored in the storing memory without waiting for the end of the transmission of the papers.

BRIEF DESCRIPTION OF THE DRAWING

The above object and features of the present invention will be more apparent from the following description of the preferred embodiment with reference to the drawings, wherein.

DESCRIPTION OF THE PREFERRED EMBODIMENT

For better understanding of the present invention, a conventional multi-address calling system will first be described with reference to FIGS. 1 to 4.

Figure 1:
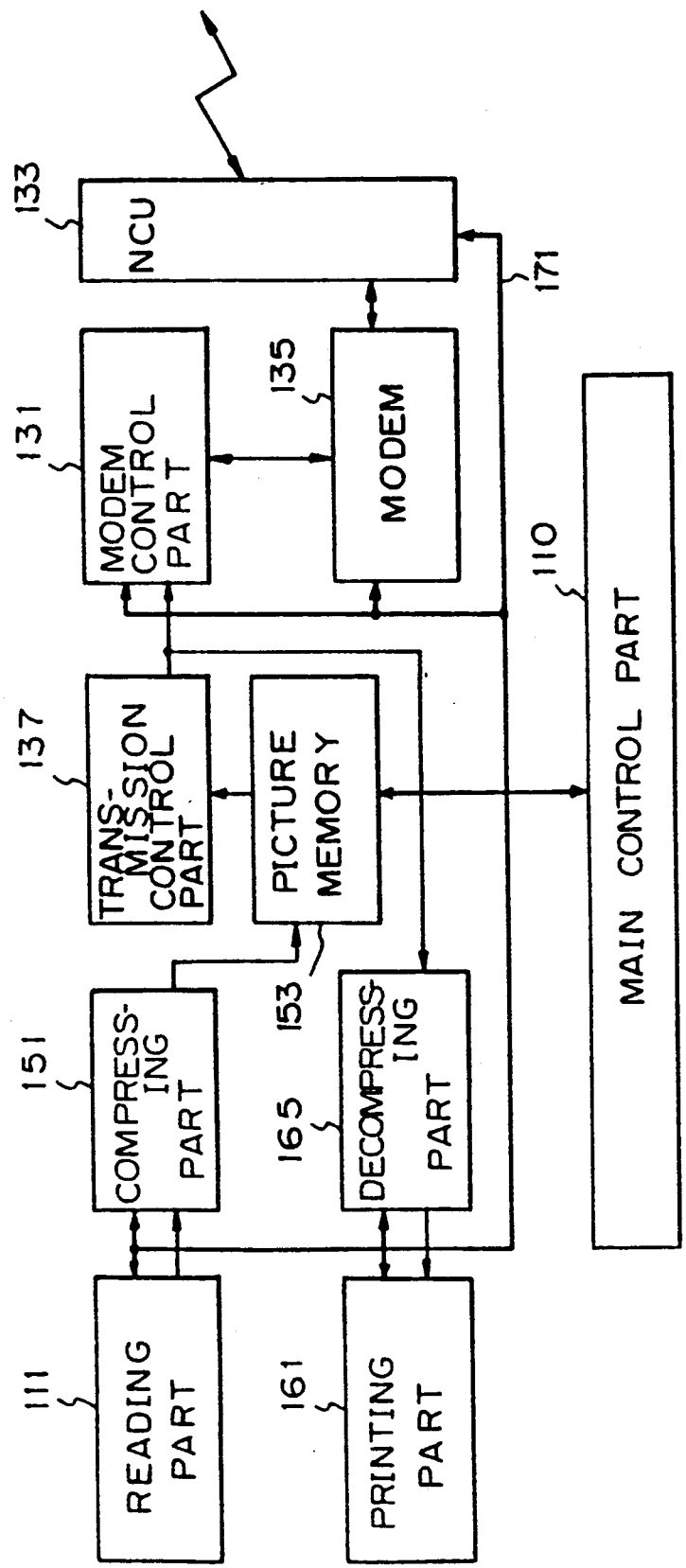
FIG. 1 is a schematic block diagram of the constitution of a conventional facsimile device.
Figure 2:
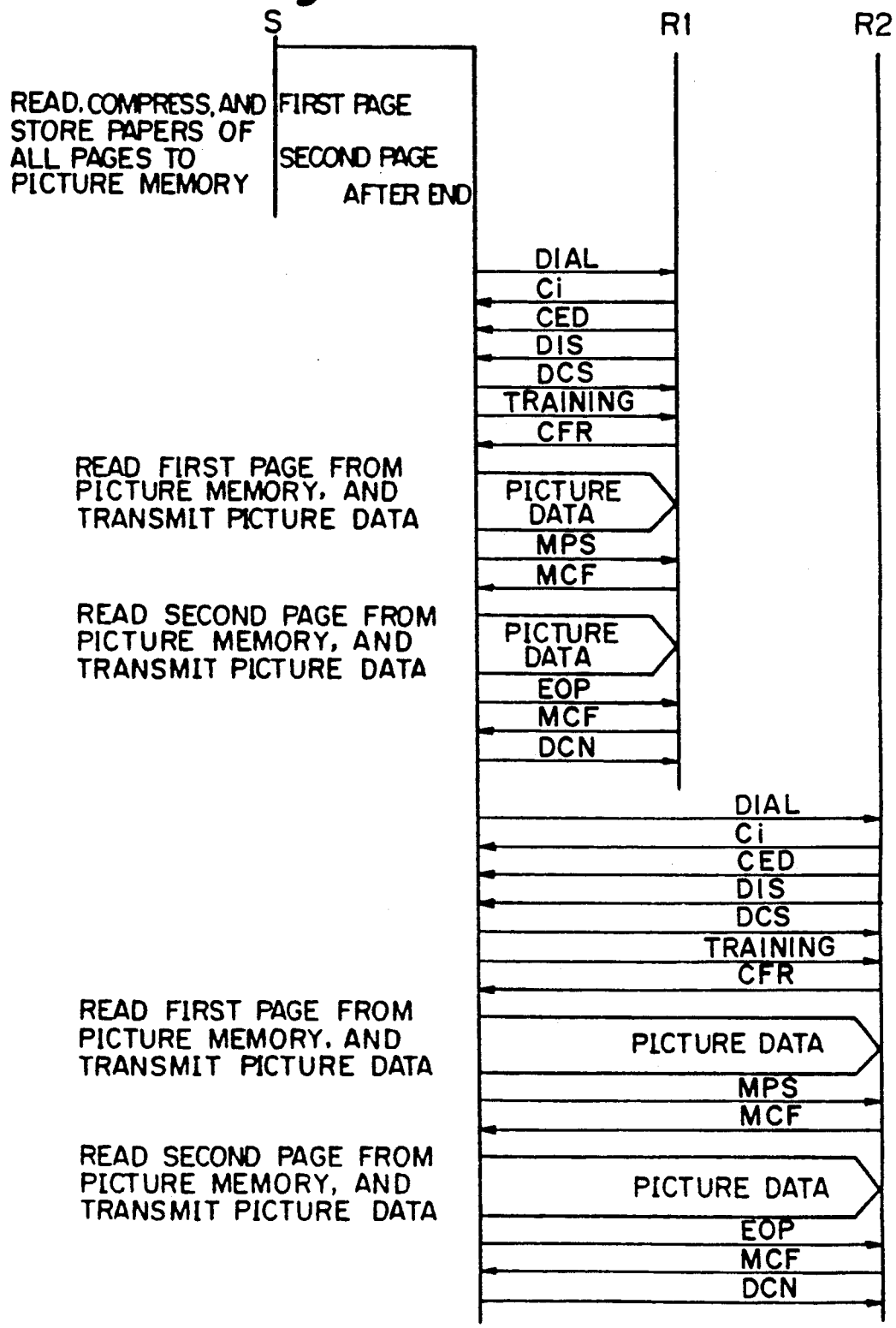
FIG. 2 is a relative timing diagram explaining a conventional communication sequence.

FIG. 1 shows a constitution of a conventional facsimile device, and FIG. 2 shows communication procedures in a conventional multi-address calling operation.

The conventional facsimile device comprises a reading part 111 for reading picture data from a sheet of paper (not shown) to be transmitted a printing part 161 for printing picture data received, a compressing part 151 for compressing data to be transmitted, a decompressing part 165 for reproducing received data, a picture memory 153 consisting of a RAM (Random Access Memory), for storing the data to be transmitted, a transmission control part 137 for controlling the transmission of the picture data stored in the picture memory 153, a modem 135 for modulating and demodulating data, an NCU (Network Control Unit) 133 for controlling external lines, a modem control part 131 for controlling the modem 135 to transmit and receive procedure signals, and a main control part 110 for carrying out an overall control.

As shown in FIG. 2, in the communication procedures in the conventional multi-address calling operation, the entire contents of each page of the pages to be transmitted are first read, compressed, and stored to the picture memory 153 in the transmission origin (S). Then, after completion of storage in the picture memory 153 of the entire contents of each page to be transmitted, the communication procedure for the first destination (R1) is started. That is, in the communication sequence for the first destination, the transmission of the picture data is effected by reading the picture data stored in the picture memory 153 page by page. Transmission to destinations on and after the second destination (R2) is carried out in the same way as the first destination. Note that FIG. 2 shows the communication procedure up to the second station and when two pages are to be transmitted.

As described above, in the conventional multi-address calling system, since the process is sequential in such a way that the communication procedure is started by calling the transmission destination only after completion of the reading, compressing, and storing in the picture memory of the entire contents of each page to be transmitted. Therefore, problems arise in that a long time is required to transmit all of the pages, and the accessibility of the device as a whole is restricted. Namely, in FIG. 2, the time period spent for the reading, compressing, and storing operation cannot be used for the communication procedures between the transmission source and the destinations.

Figure 3:
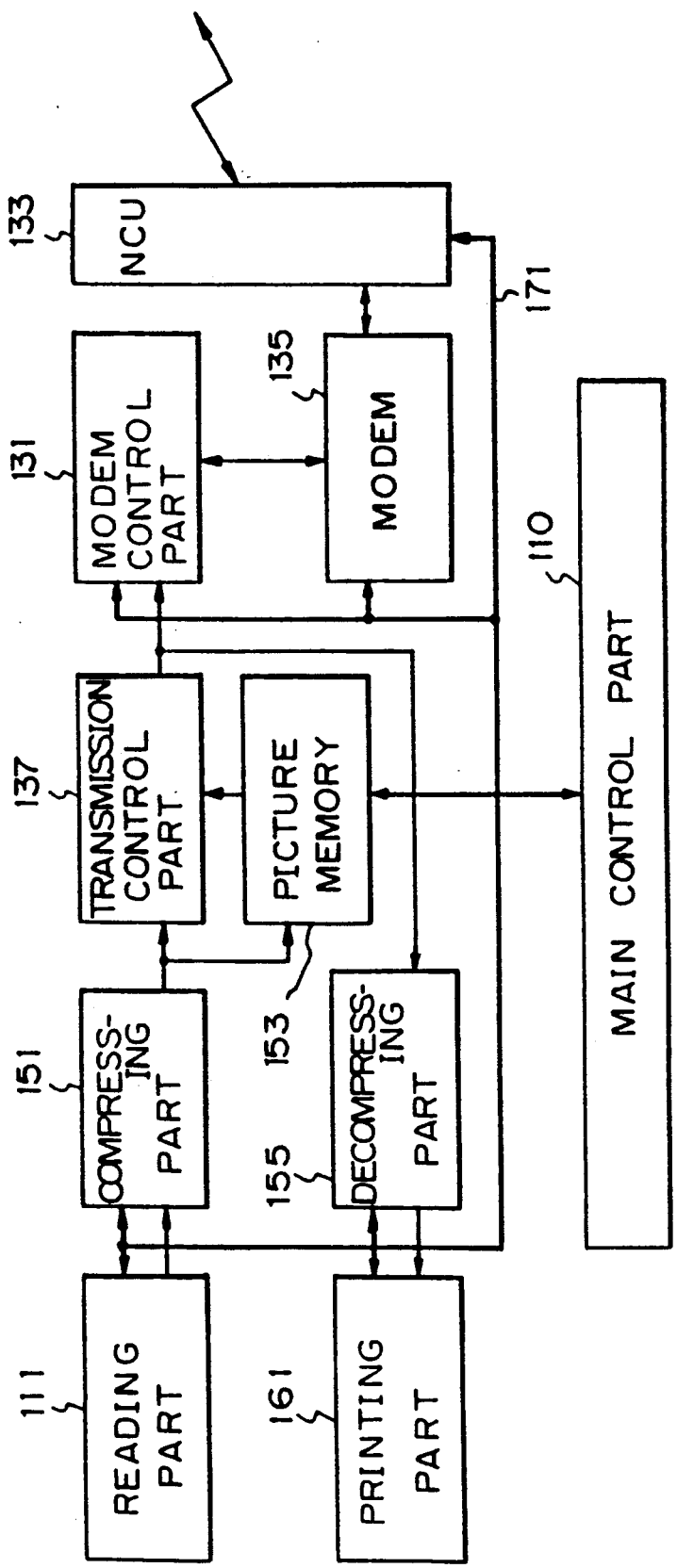
FIG. 3 is a schematic block diagram of the constitution of an another conventional facsimile device.

FIG. 3 shows another example of the conventional facsimile device which is disclosed in Japanese Unexamined Patent Publication No. 63-36651.

The facsimile equipment shown in FIG. 3 is quite similar to the equipment shown in FIG. 1 except that the output of the compressing part 151 is connected not only to the input of the picture memory 153 but also to the input of the picture data transmission control part 137.

The procedure of the multi-address calling operation will be explained with reference to FIG. 4 in the following.

Figure 4:
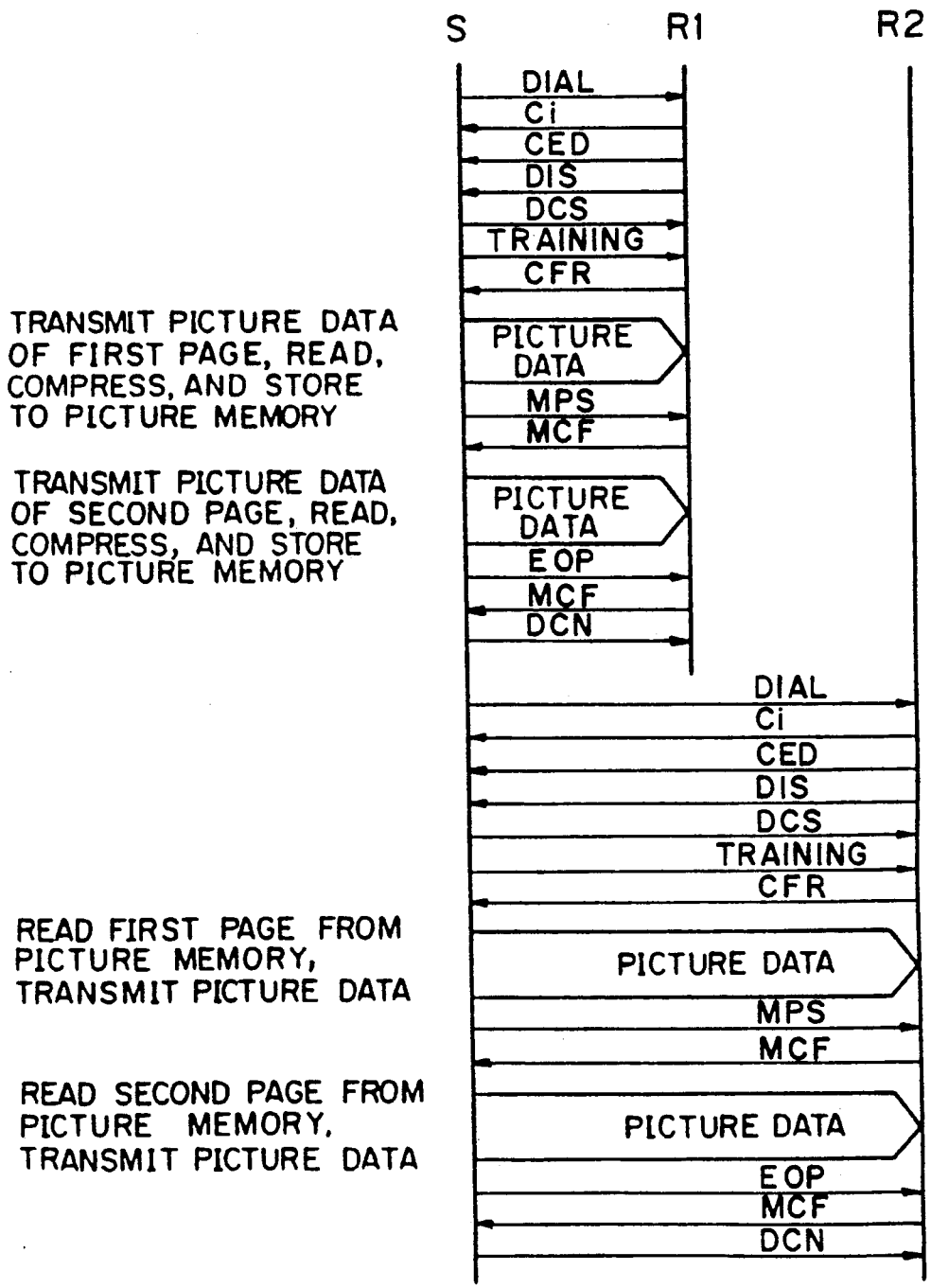
FIG. 4 is a relative timing diagram explaining the communication control procedure in the conventional facsimile device shown in FIG. 3.

FIG. 4 shows a communication control procedure when performing a multi-address calling operation. Note that, in the figure, the communication control procedure up to and including transmission to a second destination is illustrated.

The following description is made with reference to FIG. 3 and FIG. 4.

First, the transmission source (S) transmits a 16 Hz calling signal to the first destination (R1), based on a telephone number.

In response, a signal CED, which informs the transmission source that the first destination is a facsimile device, is received from the first destination.

Further, a signal DIS, which informs the transmission source of the facsimile ability defined in the CCITT standard, is received.

The transmission source then transmits a signal DCS in response to the signal DIS.

Next, the transmision origin transmits a signal TCF, which is a training signal for acknowledging the line quality, and in response, receives a signal CFR, which is a signal indicating that reception is possible at the communication speed transmitted from the transmission source.

Only after the above described pre-procedure with the first destination is finished, is the operation of reading the picture data started. Note that, in this example, the two pages of papers are assumed to be set in a document feeder (now shown) provided in the reading part 111.

First, the picture data of the first page read by the reading part 111 is sent to the compressing part 151 and coded therein. The picture data coded in the compressing part 151 is then sent to the transmission control part 137 and is also stored in the picture memory 153.

The picture data transmitted to the transmission control part 137 is further transmitted to the modem control part 131, and under control thereof, is transmitted through the modem 135 and NCU 133 to the first destination.

After transmitting the picture data of the first page as described above, the transmission source transmits a signal MPS which indicates an end of the transmission, and in response, receives a signal MCF which indicates that the picture data has been correctly received.

Next, the reading part 111 reads the second page and transmits the data to the compressing part 151. The picture data transmitted to the compressing part 151 is coded therein and transmitted to the transmission control part 137, and further, is stored in the picture memory 153. The picture data of the second page transmitted to the transmission control part 137 is further sent to the modem control part 131, and under the control thereof, is transmitted through the modem 135 and NCU 133 to the first destination.

After the picture data of the second page (final page) has been transmitted, the transmission source transmits a signal EOP indicating the end of the transmission, and in response, receives a signal MCF indicating that the picture data has been correctly received.

Finally, the transmission source transmits a signal DCN to disconnect the line, and thus, the transmission to the first destination is finished.

Then, a transmission to the second destination (R2) is started.

Similar to the first destination, first a 16 Hz calling signal is transmitted based on a telephone number, and in response, a signal CED informing the transmission source that the facsimile device is ready to receive is received from the second destination.

Further, a signal DIS informing the transmission source of the facsimile ability defined in the CCITT standard is received, and the transmission source transmits a signal DCS in response to the signal DIS.

Further, the transmission source transmits a signal TCF, which is a training signal for acknowledging the line quality.

Finally, the transmission source receives a signal CFR, which is a Confirmation to Receive signal from the first destination.

After performing the pre-procedure as described above, the picture data stored in the picture memory 153 during the transmission to the first destination is read and transmitted.

First, the picture data of the first page stored in the picture memory 153 is read and transmitted to the modem control part 131 under the control of the transmission control part 137. Also, the picture data of the first page transmitted to the modem control part 131 is transmitted, under the control thereof, through the modem 135 and the NCU 133 to the second destination.

After the transmission of the picture data of the first page is finished, a signal MPS indicating an end of the transmission is transmitted, and in response, a signal MCF is received indicating that the picture data has been correctly received.

Next, the picture data of the second page stored in the picture memory 153 is read and transmitted to the modem control part 131 under the control of the transmission control part 137. The picture data of the second page transmitted to the modem control part 131 is transmitted, under the control thereof, through the modem 135 and the NCU 133 to the second destination. After the transmission of the picture data of the second page (final page) is finished, a signal EOP indicating the end of the transmission is transmitted, and in response, a signal MCF is received indicating that the picture data has been correctly received.

Finally, a signal DCN to disconnect the line is transmitted.

Note that, with respect to the destinations on and after the third destination, a similar processing as in the second destination is effected.

Thus, after the end of the pre-procedure for the first destination, the reading, compressing, and storing of the picture data of the papers, page by page, is effected, and the transmission of the picture data to the first destination is effected in parallel with the reading, compressing, and storing of the papers with respect to the first destination.

Also, to the stations on and after the second station, the picture data stored during the processing with respect to the first destination is read page by page and then transmitted. Accordingly, the reading of the pages and the transmission to the first destination are effected in parallel, so that the accessibility in the multi-address calling operation can be increased in comparison with the before-described first conventional example with reference to FIGS. 1 and 2.

The conventional example shown in FIGS. 3 and 4, however, has the following disadvantage. Namely, in the conventional example shown in FIGS. 3 and 4, the reading of the papers is finished only after the final page is transmitted to the first destination. Therefore, when another set of pages is to be transmitted, the user must wait before putting in the set of pages until the end of the transmission of the previous set of pages to the first destination. In this case, the conventioanl example shown in FIGS. 3 and 4 also has a low accessibility.

Before describing the embodiment of the present shown in FIGS. 6 and 9, the principle of the present invention will be described with reference to FIG. 5.

The multi-address calling system according to the present invention is intended for transmitting the same picture data to a plurality of destinations at the same time or sequentially. The system includes reading means 511, compressing means 513, storing means 515, communication control means 517, and control means 519.

The reading means 511 reads the pictures or characters on the pages to be transmitted so as to output picture data; the compressing means 513 performs a compressing process on the picture data output from the reading means 511; the storing means 515 stores the compressed picture data output from the compressing means 513; the communication control means 517 transmits the picture data read from the storing means 515 to the destinations, transmits and receives signals for communication procedures to and from the destinations; and the control means 519 controls the operation of the reading means 511, the compressing means 513, the storing means 515, and the communication control means 517.

According to the present invention, the control means 519 controls the processes performed by the reading means 511, the compressing means 513, and the storing means 515 in parallel with and asynchronous with at least a part of the processes performed by the communication control means 517.

In operation, under the control of the control means 519, the reading means 511, the compressing means 513, and the storing means 515 start to read, compress, and store the pictures or characters page by page without stopping at the begining of a multi-address call, regardless of whether or not the communication procedures are in progress.

Thus, according to the present invention, by performing the reading, compressing, and storing of the picture data in parallel with and asynchronous with the communication procedures, the accessibility of the system when multi-address calling is being carried out can be increased. Namely, because the storing speed of the storing means is sufficiently high, at least one page of the picture data is already stored in the storing means 515 when the communication procedures performed before transmitting the picture data of the first page are finished. Therefore, the transmission of the first page is possible immediately after the end of the pre-procedure. Further, since the pictures or characters of a complete set of pages put into the system are read page by page without stopping regardless of whether or not the communication procedures are in progress, another set of pages can be put into the system as soon as the reading operation of the previous set of pages is finished and as long as the memory capacity of the storing means 515 allows storage of further picture data, even when the transmission of the previous set of pages is still in progress. This gives the users free time for other work. Namely, the user need not wait for the end of the transmission of the previous set of the pages but can merely put the next set of the pages into the system after the end of the reading operation of the previous set of pages.

An embodiment of the present invention will now be explained in detail.

Figure 6:
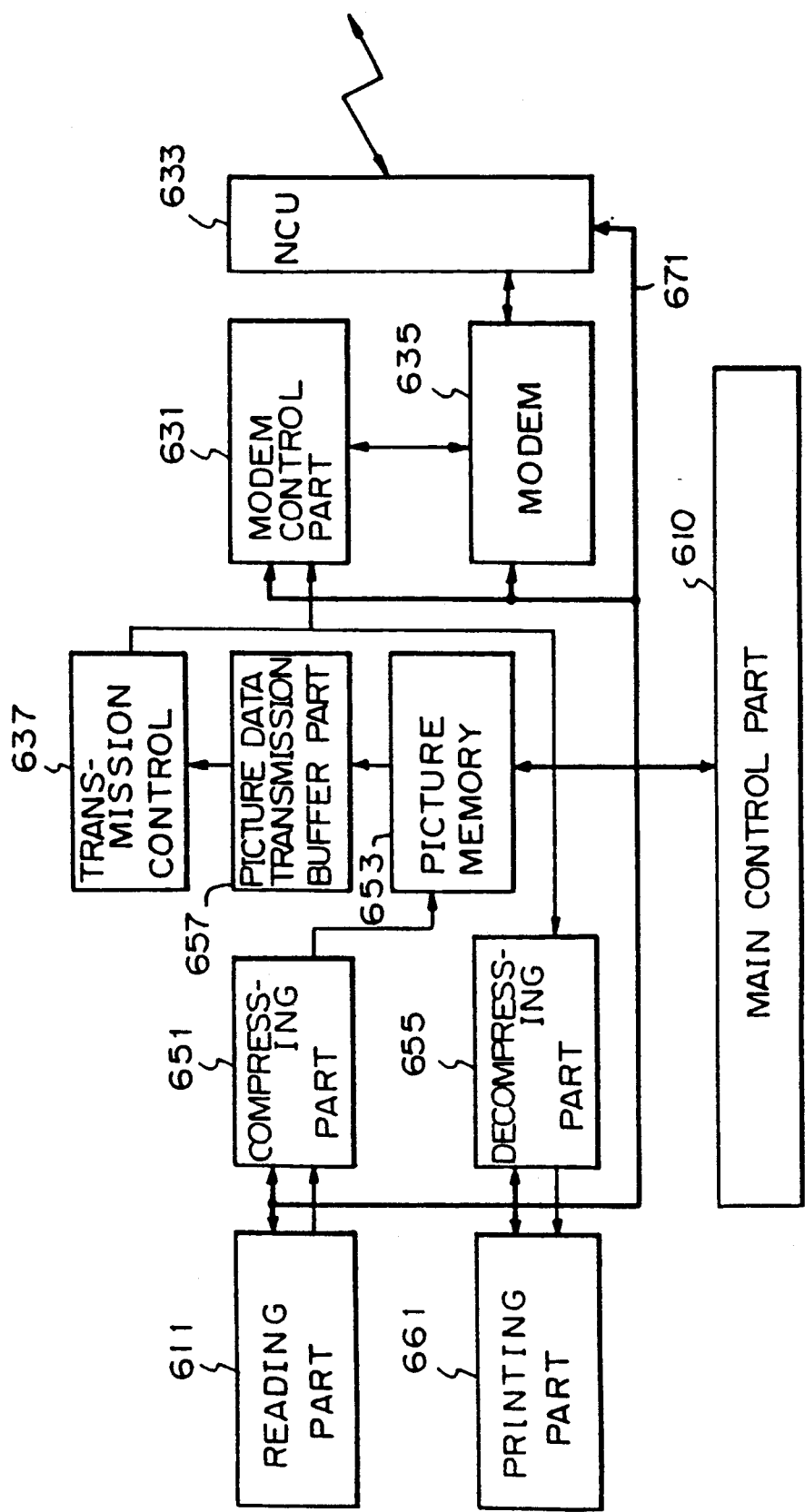
FIG. 6 is a schematic block diagram of the constitution of a facsimile device, according to an embodiment of the present invention.

FIG. 6 is a schematic block diagram of a facsimile device according to an embodiment of the present invention.

I. Corresponding Relationship between the Embodiment and FIG. 5

Figure 5:
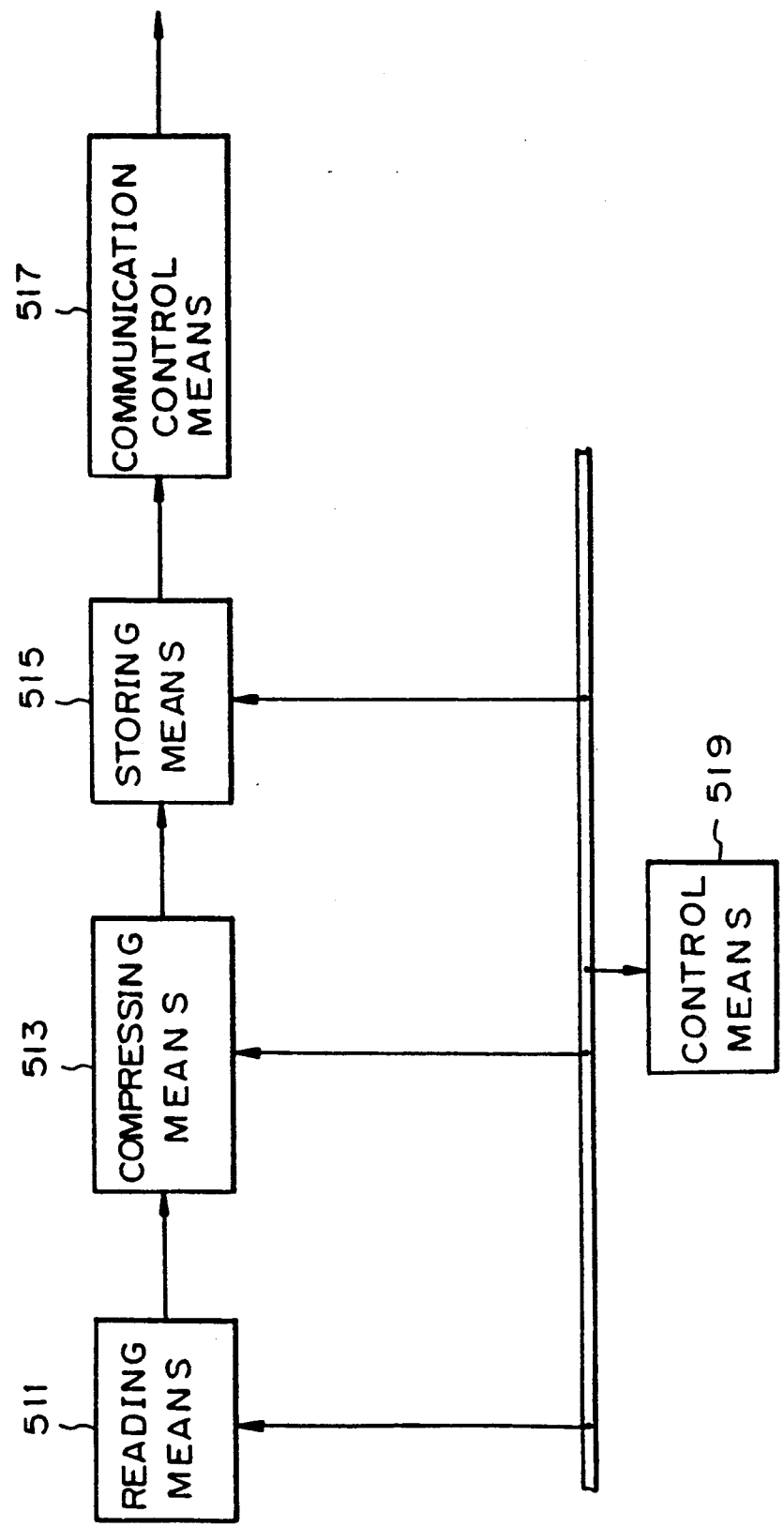
FIG. 5 is a schematic block diagram of a multi-address calling system according to the present invention.

Here, the corresponding relationship between the embodiment and FIG. 5 is discussed.

The reading means 511 corresponds to a reading part 611; the compressing means 513 corresponds to a compressing part 651; the storing means 515 corresponds to a picture memory 653; the communication control means 517 corresponds to a picture data transmission buffer part 657, a transmission control part 637, a modem control part 631, a modem 635, and an NCU 633; and control means 519 corresponds to a main control part 610.

The embodiment of the present invention will be explained in the following, based on the above corresponding relationship.

II. Constitution of the Embodiment

In FIG. 6, the facsimile device comprises a reading part 611 for reading the pictures or characters on pages to be transmitted (not shown), a printing part 661 for printing the picture data of pages received, a compressing part 651 for compressing data read from the reading part 611, a decompressing part 655 for decompressing received data, a picture memory 653 including a random access memory (RAM) for storing the compressed data to be transmitted, a picture data transmission buffer part 657 for temporarily storing the picture data to be transmitted before transmission thereof, a transmission control part 637 for controlling the transmission of the picture data stored in the picture memory 653, a modem 635 for modulating and demodulating signals for procedures or picture data, a network control unit (NCU) 633 for controlling the external lines, a modem control part 631 for controlling the modem 635 for transmitting and receiving instruction signals (or procedure signals), and a main control part 610 for performing an overall control.

The modem control 631, the modem 635, the NCU 633, the compressing part 651, the decompressing part 655, the picture memory 653, the reading part 611, and the printing part 661 are interconnected to the main control part 610 via a data bus 671. The data read by the reading part 611 is input to the compressing part 651, and data received by the decompressing part 655 is input to the printing part 661.

The picture data compressed by the compressing part 651 is stored in the picture memory 653. The picture data stored in the picture memory 653 is stored in the picture data transmitting buffer 657, and then transmitted from the transmission control part 637 through the modem control part 631, the modem 635, and the NCU 633 to the destinations, under the control of the main control part 610.

Also, the picture data received through the NCU 633, the modem 635, and the modem control part 631 under the control of the main control part 610 are transmitted to the decompressing part 655.

III. Operation of the Embodiment

The sequence of the multi-address calling operation in the facsimile device constructed as described above will be explained in the following.

Figure 7:
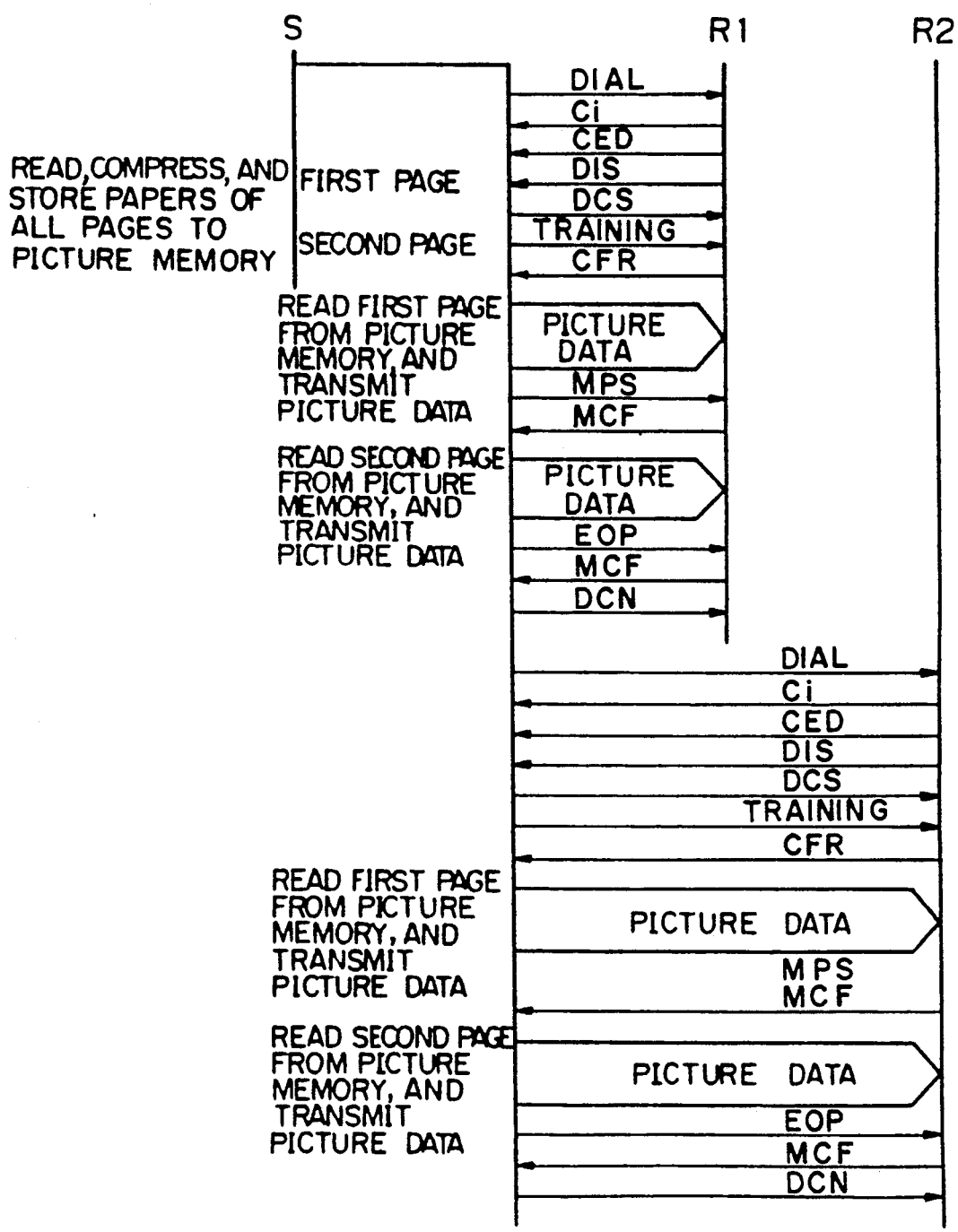
FIG. 7 is a relative timing diagram explaining the communication control procedure according to the embodiment of the present invention shown in FIG. 6.

FIG. 7 shows a communication control sequence when performing a multi-address calling operation. Note that, in the figure, the communication control sequence up to and including transmission to a second destination is illustrated. The present invention, however, is not restricted to this but there may be more than two destinations. Also, in the figure, the multi-address calling operation in this embodiment is performed sequentially from the first destination to the second destination. The present invention, however, is not restricted to the sequential multi-address calling but may also be applied to a simultaneous multi-address calling operation.

The following description is made with reference to FIG. 6 and FIG. 7.

First, the user at the transmission source (S) puts the pages to be transmitted to a plurality of destinations into the document feeder (not shown in the figure) of the facsimile device. The document feeder is provided in the reading part 611. The user then inputs the telephone numbers of the first destination and the second destination.

Based on the input telephone numbers, first, the transmission source (S) transmits a 16 Hertz calling signal to the first destination (R1). In response, a Call Identification signal Ci and a Called Station Identification signal CED, which informs the transmission source (S) that the first destination (R1) is a facsimile device, is received from the first station (R1).

When multi-address calling is to be effected and once the transmission device (S) recognizes by receiving the signal CED that the first destination is a facsimile device, the reading part 611 starts to read the characters or pictures page by page continuouly without stopping regardless of procedures being carried out between the transmission source (S) and the destinations.

After the signal CED is received, a Digital Identification Signal DIS, which informs the transmission source (S) of the facsimile ability defined in the CCITT standard, is received.

The transmission source (S) then transmits a Digital Command Signal DCS which is a response signal to the DIS.

Next, the transmission source (S) transmits a Training Check Signal TCF, which is a training signal for acknowledging the line quality, and in response, receives a Confirmation to Receive signal CFR, which is a signal indicating reception is possible at the communication speed transmitted from the transmission source (S).

The above-described procedures from the dialing to the reception of the signal CFR are referred to as a pre-procedure and take place before the transmission of the picture data.

After the end of the pre-procedure with respect to the first destination, the transmitting operation of the picture data is started.

Since the storing speed of the picture memory 653 is sufficiently high, the picture data of at least one page is already stored in the picture memory 653 at the end of the pre-procedure. The picture data is read page by page from the picture memory 653 and is temporarily stored in the picture data transmission buffer part 657, which absorbs the difference between the reading speed of the picture memory 653 and the transmitting speed at the transmission control part 637. In general, the reading speed is much higher than the transmitting speed. The picture data of the first page transmitted to the transmission control part 637 is further transmitted through the modem control part 631, and under control thereof, through the modem 635 and the NCU 633 to the first destination.

After transmitting the picture data of the first page as described above, the transmission source (S) transmits a Multi-Page Signal MPS which indicates an end of the transmission of a page, and in response, receives a Message Confirmation MCF which indicates that the picture data has been correctly received. Next, the transmission control part 637 reads the second page to be transmitted and transmits the picture data through the modem control part 631, the modem 635, and the NCU 633 to the first destination.

After the picture data of the second page (final page in this general explanation) has been transmitted, the transmission origin transmits an End of Procedure signal EOP indicating the end of the transmission, and in response, receives a signal MCF indicating that the picture data has been correctly received.

Finally, the transmission source (S) transmits a Disconnect signal DCN to disconnecting the line between the transmission source (S) and the first destination (R1), and thus, the transmission to the first station is finished.

The above-described procedures from the receiving of the signal EOP to the transmission of the signal DCN are referred to as a post-procedure.

Next, a transmission to the second station (R2) is started.

Similar to the first station, the pre-procedure, the picture data transmission of the first page, the intermediate procedure, the transmission of the second page, and the post procedure are carried out for the second destination.

With respect to the destinations on and after the third destination, a similar processing as in the second destination is effected.

As described above, according to the embodiment of the present invention, the transmission source performs the reading, compressing, and storing of the picture data of the papers in parallel and asynchronous with the pre-procedure to the first destination (R1), and after the pre-procedure to the first destination is completed, the picture data of the pages which has been stored is read, page by page, and transmitted. Note that, the transmission buffer 657 is provided to absorb the difference between the reading speed in the picture memory 653 and the transmission speed in the transmission control part 637.

IV. Summary of the Embodiment

The reading, compressing, and storing are effected in parallel and asynchronous with the pre-procedure to the first destination (R1), and, during the transmission to the first destination, the picture data already stored is read, page by page, and transmitted.

Also, the stored picture data is read, page by page, and transmitted to the destinations on and after the second destination. Accordingly, since the reading of the pages and the transmission to the first destination are effected in parallel, and the accessibility during the multi-address calling operation is increased.

V. Modified Aspects of the Invention

Note that the above explanation concerned the corresponding relationships between the present invention and the embodiment, but, the present invention is not restricted thereto, and it will be easily determined by those skilled in the art that various modification may be made. For example, the multi-address calling system according to the present invention may be applied to both sequential addressing and simultaneous addressing. Also, the reading, compressing and storing operation may be started at the beginning of a multi-address calling operation without waiting for the signal CED.

As described above, according to the present invention, by effecting the communication procedure to the first destination in parallel with and asynchronous with the reading, compressing, and storing of the picture data, the accessibility during multi-address calling can be increased, which is extremely useful in practice.

I claim:

1. A multi-address calling system for transmitting the same picture data to a plurality of destinations, comprising:
    reading means for reading the picture data;
    compressing means for compressing the picture data read by said reading means;
    storing means for storing the picture data compressed by said compressing means;
    communication control means for transmitting and receiving signals of communication procedures to and from the destinations; and
    control means for controlling said communication procedures with the destinations so that said communication procedures are effected in parallel with and asynchronous with the operation of said reading means, said compressing means, and said storing means.

2. A multi-address calling system according to claim 1, wherein said control means includes:
    means for controlling communication procedures with a first destination so that said communication procedures with said first destination are effected in parallel with and asynchronous with operation of said reading means, said compressing means, and said storing means are the procedures between a transmission source and a first destination.

3. A multi-address calling system according to claim 1, wherein said communication procedures include a pre-procedure performed before transmitting picture data, and wherein said reading means comprises:
    means for continuously reading pages of the picture data, independent of said procedure.

4. A multi-address calling system according to claim 3, wherein said compressing means comprises:
    means for compressing, independent of said pre-procedure, the picture data read by said reading means.

5. A multi-address calling system according to claim 3, wherein said storing means comprises:
    means for storing, independent of said pre-procedure, the compressed picture data.

6. A multi-address calling system according to claim 3, wherein said control means comprises:
    read and transmit means for reading a first page of the picture data from said storing means and for transmitting said first page to a first destination, independent of the storing operation of said storing means.

7. A multi-address calling system according to claim 1, wherein the picture data includes pages, and said communication procedures include a post-procedure performed after transmitting picture data, and said control means comprises:
    means for reading the picture data on and after a second page from said storing means and for transmitting said picture data on or after the second page to a first destination, immediately after said post-procedure for the previous page is finished.

8. A multi-address calling system according to claim 1, wherein the picture data includes pages and said control means comprises:
    read and transmit means for reading a first page of the picture data from said storing means and for transmitting said first page to a second destination, independent of the storing operation of said storing means.

9. A multi-address calling system according to claim 1, wherein the picture data includes pages, and said communication procedures include a post-procedure performed after transmitting picture data, and said control means comprises:
    means for reading the picture data on and after a second page from said storing means and transmitting the picture data on and after the second page to the second destination, immediately after said post-procedure for the previous page is finished.

10. A multi-address calling system according to claim 1, wherein said system multi-address calling system is a facsimile device.

11. A multi-address calling system for transmitting picture data and communication procedure signals to and receiving communication procedure signals from a plurality of destinations, comprising:
    read and store means for reading the picture data and for storing the read picture data;

communication control means for controlling transmission and reception of the communication procedure signals to and from the destinations; and main control means, operatively connected to said read and store means and to said communication control means, for controlling said read and store means and said communication control means so that said read and store means operates during transmision and reception of the communication procedure signals and independent of the communication procedure signals being received and transmitted.

12. A multi-address calling system as recited in claim 11, wherein said read and store means includes;
means for compressing said read picture data before it is stored.

13. A method of transmitting picture data to a plurality of destinations, comprising the steps of:
(a) controlling transmission and reception of communication procedure signals to and from the destinations; and
(b) reading and storing the picture data during transmission and reception of the communication procedure signals and independent of the communication procedure signals being received and transmitted.

14. A method as recited in claim 12, further comprising the step of:
reading a portion of the picture data stored in step (b) and transmitting said portion of the picture data to at least one destination, independent of the stage of completion of step (b).

15. A method as recited in claim 13, wherein step (b) includes the sub-step of:
compressing the picture data before it is stored.

16. A multi-address calling system according to claim 6, wherein said read and transmit means includes:
means for reading said first page of the picture data from the storing means and for transmitting said first page to said first destination, immediately after said pre-procedure for the first destination is finished.

17. A multi-address calling system according to claim 8, wherein said communication procedures include a pre-procedure performed before transmitting picture data, and said read and transmit means includes:
means for reading said first page of the picture data from said storing means and for transmitting said first page to said second destination, immediately after said pre-procedure for said second destination is finished.

* * * * *

UNITED STATES PATENT AND TRADEMARK OFFICE
CERTIFICATE OF CORRECTION

PATENT NO. : 5,050,006

DATED : September 17, 1991

INVENTOR(S) : SATOSHI OGAWA

It is certified that error appears in the above-identified patent and that said Letters Patent is hereby corrected as shown below:

TITLE PAGE: Item [56]  "U.S. PATENT DOCUMENTS", "2/1988" should be --7/1985--.
Insert --4,727,429  2/1988  Ueno  358/434--.
Insert --OTHER DOCUMENTS
Patent Abstracts of Japan, Vol. 12, No. 250 (E-633)(3097), 14 July 1988; & JP-A-63 036 651 (TOSHIBA) 17.02.1988.

Patent Abstracts of Japan, Vol. 9, No. 47 (E-299), 27 February 1985; & JP-A-59 185 469 (FUJI) 22.10.1984.

Tonau Osatake et al., "Traffic Handling Characteristics of a Multi-Adress Calling System", The Transactions of the IECE of Japan, Vol. E 60, No. 9, September 1977, pages 497-498.--

Column 1, line 42, after "the" insert --pages--.

UNITED STATES PATENT AND TRADEMARK OFFICE
CERTIFICATE OF CORRECTION

PATENT NO. : 5,050,006

DATED : September 17, 1991

INVENTOR(S) : Satoshi Ogawa

It is certified that error appears in the above-identified patent and that said Letters Patent is hereby corrected as shown below:

Column 2, line 46, after "transmitted" insert --,--.

Column 10, line 13, "procedure" should be --pre-procedure--.

Signed and Sealed this

Second Day of March, 1993

Attest:

STEPHEN G. KUNIN

Attesting Officer

Acting Commissioner of Patents and Trademarks